United States Patent [19]

Economy et al.

[11] 4,238,547

[45] Dec. 9, 1980

[54] HIGH STRENGTH YARN CONSISTING OF BORON CARBIDE FIBERS

[75] Inventors: James Economy, Eggertsville; Ruey Y. Lin, Williamsville; William D. Smith, Tonawanda, all of N.Y.

[73] Assignee: The Carborundum Company, Niagara Falls, N.Y.

[21] Appl. No.: 965,671

[22] Filed: Dec. 1, 1978

Related U.S. Application Data

[60] Continuation of Ser. No. 810,222, Jun. 27, 1977, abandoned, which is a continuation of Ser. No. 677,582, Apr. 16, 1976, abandoned, which is a division of Ser. No. 345,376, Mar. 27, 1973, Pat. No. 3,971,840.

[51] Int. Cl.³ .............................................. D02G 3/00
[52] U.S. Cl. ..................................... 428/366; 423/291; 428/367; 428/401; 428/902
[58] Field of Search ............... 428/366, 367, 364, 401, 428/902; 423/291, 252, 345, 439, 447.2; 264/231, 82, 346, DIG. 19, DIG. 67; 57/200, 243

[56] References Cited

U.S. PATENT DOCUMENTS

| | | | |
|---|---|---|---|
| 3,269,802 | 8/1966 | Wainer et al. | 423/439 X |
| 3,403,008 | 9/1968 | Hamling | 423/291 X |
| 3,479,205 | 11/1969 | Morelock | 428/366 X |
| 3,652,221 | 3/1972 | Sloka | 423/447.1 |
| 3,668,006 | 6/1972 | Higgins et al. | 428/902 |
| 3,668,059 | 6/1972 | Economy et al. | 423/290 X |
| 3,702,054 | 11/1972 | Araki et al. | 264/29 |
| 3,705,236 | 12/1972 | Ishikawa | 423/447.1 |
| 3,716,331 | 2/1973 | Schalamon et al. | 423/447.5 |
| 3,725,533 | 4/1973 | Economy et al. | 423/291 |
| 3,755,061 | 8/1973 | Schurb | 428/366 |
| 3,764,662 | 10/1973 | Roberts | 423/447.2 |

OTHER PUBLICATIONS

Gatti et al., "The Synthesis of Boron Carbide Filaments", Space Sciences Laboratory, Jan. 10, 1964.

*Primary Examiner*—Lorraine T. Kendell
*Attorney, Agent, or Firm*—David E. Dougherty; Raymond W. Green

[57] ABSTRACT

A process for strengthening carbide fibers by removing internal stresses caused by their formation. This process is accomplished by drawing the carbide fiber under tension through a furnace. The temperature of the furnace may range from about 2050° to 2300° C. while the fiber tensile stress may vary from about 200 to 3500 p.s.i. when using boron carbide fibers with diameters ranging from about 8 to 14 microns.

12 Claims, 2 Drawing Figures

HIGH STRENGTH YARN CONSISTING OF BORON CARBIDE FIBERS

This is a continuation of copending application Ser. No. 810,222, filed June 27, 1977, which is a continuation of application Ser. No. 677,582, filed Apr. 16, 1976, both now abandoned, application Ser. No. 677,582 being in turn a division of application Ser. No. 345,376, filed Mar. 27, 1973, now U.S. Pat. No. 3,971,840.

BACKGROUND OF THE INVENTION

During the past years, refractory fibers of heat resistant materials, such as alumina, silica, glasses of various compositions and high melting metals have come into general use for the fabrication of materials for high temperature applications. Refractory fibers have proved their utility as components of thermal insulation and as reinforcing agents in composite light weight materials. Non-metallic fibers, as compared to metals, are more resistant to oxidation and chemical attack. Several processes have been described for the production of refractory non-metallic fibers, two of such processes being disclosed in U.S. Pat. Nos. 3,269,802 and 3,433,725. Both of these patents describe the treatment of carbon yarn to form carbide fibers; these, however, are rather deficient in tensile strength and are not well suited for applications where the fiber serves as a reinforcing for a composite article. A process or method for strengthening these fibers is therefore desirable, since carbide fibers are well suited in other respects for composite reinforcing media and would find increasing use if the fiber tensile strength could be increased.

SUMMARY OF THE INVENTION

The invention relates to a carbide containing fiber of improved strength, the fiber being made by a process, such as that of first heating a carbonaceous fiber in the vapor of a halide of a carbide forming element. The improvement in fiber strength is achieved by a second heating of the fiber under a controlled degree of tension, during which operation the internal stresses in the fiber are greatly reduced and its tensile strength increased. Temperatures during the second heating step range from about 2050° to about 2300° C., with fiber stress ranging from about 200 to about 3500 p.s.i. The resulting high strength fiber has an essentially straight configuration with minimal internal stresses.

DETAILED DESCRIPTION OF THE INVENTION

An initial process for preparing metal carbide fibers and cloth, by the reaction of carbon fibers with metal halides and hydrogen in a furnace, has been described in U.S. Pat. No. 3,269,802. In the process of the invention, carbide containing fibers, made in a similar manner, are greatly improved by a controlled high temperature and tension treatment process which substantially increases the fiber tensile strength.

As used throughout the description and claims, the term "tension" refers to the load on a fibrous yarn and is expressed in grams or pounds as desired. Tensile stress refers to load per unit area and is independent of the number or size of the fibers in a yarn. This is usually expressed in pounds per square inch (p.s.i.). Tensile strength is the minimum load per unit area at which a fiber at room temperature will break.

In one method for the preparation of carbide containing fibers, carbon or graphite fibers are reacted in a furnace with a suitable carbide forming halide and in an atmosphere of hydrogen, argon and nitrogen. The carbonaceous fibers may be in the form of a single ply untwisted yarn consisting of several hundred fibers of about 5–10 microns diameter. Boron trichloride is the halide of choice for the preparation of boron carbide fibers, using a furnace temperature of about 1800° C. and drawing the fibrous yarn therethrough under a tensile stress of about 300 p.s.i. When the yarn is reacted with the halide, the fibers may fuse together with boron. The addition of nitrogen acts to inhibit the fusion and allows the formation of a flexible boron carbide yarn. The conversion of carbon to carbide may vary from about 20 percent to essentially complete, depending on the residence time and halide concentration in the furnace. A conversion of about 70 to 80 percent is preferred.

Figure 1:
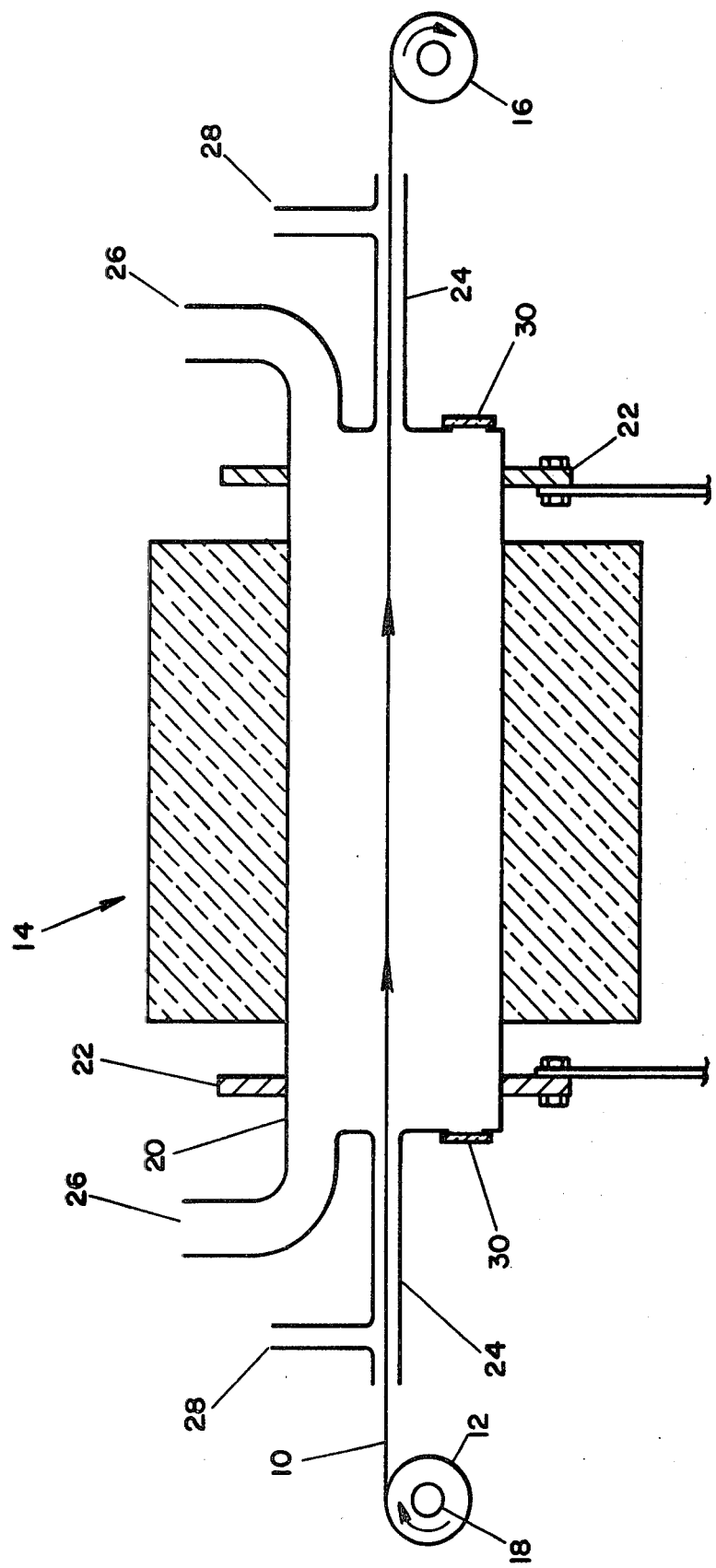
FIG. 1 shows the heat treating tube furnace through which the fiber is passed under tension.

After conversion in the above reaction, the boron carbide containing fibers are curled because of internal stresses and are relatively weak in tensile strength. In the process of the invention, the fiber internal stresses are greatly decreased and the curled fibers become straight and strong by drawing the weak fibers under a controlled tension through a furnace. The fiber treatment apparatus is shown in FIG. 1. The weak carbide fiber yarn 10 passes from a feed spool 12 and through the furnace 14, the heat treated yarn then being wound on a take-up spool 16. Tension is applied to the yarn by an adjustable friction clutch 18 attached to the feed spool 12. The furnace 14 shown has an electrically heated carbon tube 20, this tube comprising a resistance element which is heated by the passage of current between the electrodes 22. As seen in FIG. 1, the ends of the tube are partially closed by suitable inlets 24 for the admission and withdrawal of the yarn 10. Also provided are connections 26 and 28 for the admission and exit of an inert gas, such as nitrogen, argon or helium. Transparent windows 30 may be provided at one or both ends of the tube to permit sighting into the tube interior with an optical pyrometer to determine furnace temperature. While a tube furnace as shown is preferred for the process of the invention, other types of furnaces which permit a controlled heating of the fibers under tension may be used. If the fiber is sufficiently conductive, it may be heated by passing the electric current directly through the fiber itself, using suitable electrical contacts.

The boron carbide fiber yarn is heated in the range of about 2050° to about 2300° C. while under a tensile stress of about 200 to 3500 p.s.i. Within these ranges, fiber strength increases with increasing fiber tension, this increase in fiber strength with increasing fiber tension is clearly shown in Table I. The fibers used here had an apparent diameter of about 13 to 14 microns. Fiber residence time in the furnace hot zone was 3.8 minutes.

Table I

| Yarn Treatment Temperature (°C.) | Tensile Stress (p.s.i.) | Fiber Tensile Strength (p.s.i.) |
| --- | --- | --- |
| none | none | 79,000 |
| 2140 | 390 | 105,000 |
| 2140 | 780 | 118,000 |
| 2120 | 1000 | 131,000 |
| 2140 | 1080 | 147,000 |
| 2140 | 1610 | 161,000 |
| 2120 | 2100 | 194,000 |

As can be seen, the maximum fiber strength without treatment was only 79,000 p.s.i. With treatment this strength was almost tripled to 194,000 p.s.i. The trend of increasing tensile strength with increasing tensile stress during treatment is apparent.

Carbide containing fibers have practically zero ductility and it should therefore be emphasized that the process of the invention does not stretch or extend the fibers but rather removes internal fiber stresses. This treatment gives a yarn having strong and essentially straight parallel fibers. Maximum strength is usually achieved when internal stresses are removed and the fibers are essentially straight.

For those fibers shown in Table I, the preferred tensile stress for maximum strength may be higher than the 2100 p.s.i. shown. Table II shows the fiber strength developed by increasing fiber tensile stress to 3000 p.s.i. Conditions for fibers in Table II were residence times in the furnace hot zone of about 1 minute and fiber diameters of 8-9 microns.

Table II

| Straightening Temperature (°C.) | Residence Time (min.) | Straightening Tensile Stress (p.s.i.) | Fiber Tensile Strength (p.s.i.) |
| --- | --- | --- | --- |
| 2120 | 1.0 | 1560 | 191,000 |
| 2120 | 1.3 | 1595 | 216,000 |
| 2120 | 1.3 | 1735 | 224,000 |
| 2100 | 1.3 | 1995 | 208,000 |
| 2120 | 1.0 | 2038 | 238,000 |
| 2120 | 1.3 | 3000 | 304,000 |
| 2120 | 0.9 | 3000 | 309,000 |

Higher tensile stress does no harm up to about 3500 p.s.i., at which point the yarn will tend to break.

Elevated temperatures are essential for the process of the invention with the best results occuring in a range of about 2100° to about 2200° C. The effects of temperature are shown in Table III, in which the yarn was drawn through the furnace with a 5-minute residence time and under a tensile stress of about 500 p.s.i. The fibers of the yarn had diameters of about 13 to 14 microns.

Table III

| Yarn Treatment Temperature (°C.) | Fiber Tensile Strength (p.s.i.) |
| --- | --- |
| none | 40,000 |
| 2315 | 65,000 |
| 2280 | 88,000 |
| 2220 | 106,000 |
| 2185 | 111,000 |
| 2140 | 159,000 |
| 2140 | 181,000 |

Residence time of the yarn in the furnace hot zone may be decreased without detrimental effect on fiber tensile strength. The results when using a shorter residence time of 3.8 minutes are shown in Table IV. Yarn tension and fiber diameter were the same as used in Table III. This table also indicates that treatment will be relatively ineffective at temperatures below 2050° C.

Table IV

| Yarn Treatment Temperature (°C.) | Fiber Tensile Strength (p.s.i.) |
| --- | --- |
| 2180 | 176,000 |
| 2140 | 174,000 |
| 2100 | 116,000 |
| 2050 | 89,000 |

Figure 2:
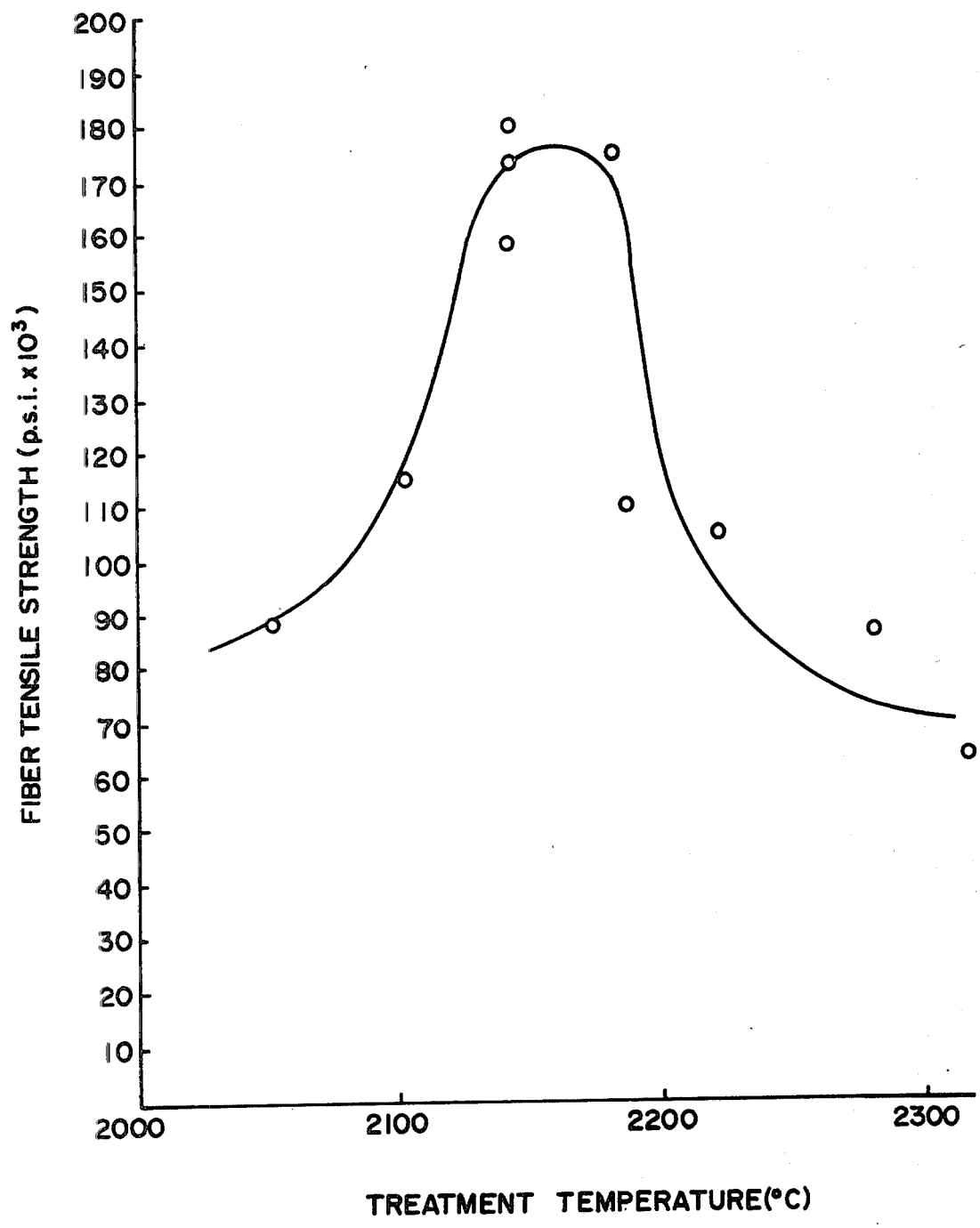
FIG. 2 is a graph showing the relationship of fiber tensile strength to treatment temperature.

The relationship between fiber strength and treatment temperature may be better understood by reference to FIG. 2, wherein the data of Tables III and IV are plotted to show fiber tensile strength as a function of temperature. From this it is apparent that desirable fiber strengths (better than 100,000 p.s.i.) occur in a temperature range of about 2100° to about 2200° C. This is confirmed by the behavior of the fibers shown in Table I, in which tensile strength was almost tripled during treatment at a temperature of 2120° to 2140° C. For curled fibers such as boron carbide, the treatment tension required is directly proportional to the fiber area. A tensile stress of about 2000 to about 3000 p.s.i. appears preferable for fibers in the 8-14 micron diameter range.

Although fiber residence times in the furnace hot zone, ranging from about 0.2 to about 10 minutes may be employed in the process of the invention, residence times of about 0.5 to about 1.5 minutes are preferred. If residence time is increased to as much as 30 minutes, the fiber strength shows a substantial decrease due to grain growth within the fiber. This effect is indicated in Table V wherein yarn comprising fibers of about 9 to 14 microns diameter was subjected to a tensile stress of about 1900 to 2100 p.s.i. and a furnace temperature of about 2120° C. to 2140° C. during the treatment process, while yarn residence times in the furnace were varied. While the results show no significant effect on fiber strength as a result of yarn residence times ranging from 0.4 to 1.3 minutes, a definite decrease in tensile strength occurs at the longer residence time of 3.8 minutes.

Table V

| Yarn Residence Time (min.) | Fiber Tensile Strength (p.s.i.) |
| --- | --- |
| 3.8 | 194,000 |
| 1.3 | 282,000 |
| 1.0 | 284,000 |
| 0.8 | 251,000 |
| 0.6 | 261,000 |
| 0.4 | 230,000 |

Although the preferred embodiment of the invention has been described in the treatment and strengthening of boron carbide containing fibers at high temperature under tension, the process of the invention is not limited to this fiber alone, but may be applied to fibers of other refractory carbides which are initially formed with internal stresses in a curled or curved configuration. Examples of such fibers are those containing the carbides of metals such as chromium, molybdenum, hafnium, zirconium, tantalum and niobium. These carbide fibers will develop internal stresses during formation and become curled. This is due to the large increase in volume of the fibers during carbide formation. Table V shows the volume changes that can be expected for complete conversion of carbon fibers of 1.42 g/cc specific gravity to metal carbides.

Table VI

| Metal Carbide | Volume Change (%) |
|---|---|
| $Cr_3C_2$ | +219 |
| $Mo_2C$ | +171 |
| $B_4C$ | +160 |
| HfC | +85 |
| ZrC | +82 |
| TaC | +64 |
| Nbc | +63 |

When the volume of the fibers increase by at least 30 to 40 percent, internal stresses become evident by curling of the fibers. At this point a high temperature and tension treatment would be needed to form high strength fibers. For boron carbide fibers, this corresponds to a conversion by weight of about 20 to 25 percent. The preferred conversion to boron cabide is 70-80 percent however. It should be noted that complete conversion of the initial carbon fiber is not essential to the process of the invention. Although the carbide-containing fibers have been described as those made by the reaction of carbon or graphite fibers with metal halides, carbide-containing fibers prepared by other methods, such as the reaction of carbonaceous fibers with compounds such as metal hydrides or metallic salts, or produced by the direct reaction of carbonaceous fibers with a carbide forming element, may also be employed in the process of the invention.

Due to their increased tensile strength, the fibers, as strengthened by the process of the invention, are uniquely suited as improved reinforcing media in the fabrication of light weight and heat resistant composites. The fibers may also be woven into a strong fabric which may then be used in applications requiring a heat resistant fabric of high tensile strength. Since the carbides have good chemical stability, the fibers may resist oxidation at temperatures as high as 700° to 800° C., thereby giving them even greater versatility as materials for high temperature applications.

What is claimed is:

1. A yarn of sufficient length to be wound on a spool, consisting of high strength fibers of essentially straight configuration and having minimal internal stresses, consisting essentially of boron carbide; the fibers having a diameter ranging from about 9 to about 14 microns and a tensile strength in the range of 194,000 psi to about 284,000 psi.

2. A yarn according to claim 1, consisting of fibers having a tensile strength of at least 230,000 psi.

3. A yarn according to claim 1, consisting of fibers having a tensile strength of at least 251,000 psi.

4. A yarn according to claim 1, consisting of fibers having a tensile strength of at least 261,000 psi.

5. A yarn according to claim 1, consisting of fibers having a tensile strength of at least 282,000 psi.

6. A yarn according to claim 1, consisting of fibers having a tensile strength of 284,000 psi.

7. A yarn of sufficient length to be wound on a spool, consisting of high strength fibers of essentially straight configuration and having minimal internal stresses, consisting essentially of boron carbide; the fibers having a diameter ranging from about 8 to about 9 microns and a tensile strength in the range of 208,000 psi to about 309,000 psi.

8. A yarn according to claim 7, consisting of fibers having a tensile strength of at least 216,000 psi.

9. A yarn according to claim 7, consisting of fibers having a tensile strength of at least 224,000 psi.

10. A yarn according to claim 7, consisting of fibers having a tensile strength of at least 238,000 psi.

11. A yarn according to claim 7, consisting of fibers having a tensile strength of at least 304,000 psi.

12. A yarn according to claim 7, consisting of fibers having a tensile strength of 309,000 psi.

* * * * *